US009195435B2

United States Patent
Sakimura et al.

(10) Patent No.: US 9,195,435 B2
(45) Date of Patent: Nov. 24, 2015

(54) IMAGE PROCESSING SOFTWARE DEVELOPMENT METHOD, IMAGE PROCESSING SOFTWARE DEVELOPMENT DEVICE, AND IMAGE PROCESSING SOFTWARE DEVELOPMENT PROGRAM

(75) Inventors: Shigetoshi Sakimura, Tokyo (JP); Masanori Miyoshi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 108 days.

(21) Appl. No.: 14/232,046

(22) PCT Filed: Aug. 3, 2011

(86) PCT No.: PCT/JP2011/067734
§ 371 (c)(1),
(2), (4) Date: Jan. 10, 2014

(87) PCT Pub. No.: WO2013/018204
PCT Pub. Date: Feb. 7, 2013

(65) Prior Publication Data
US 2014/0196003 A1    Jul. 10, 2014

(51) Int. Cl.
G06F 17/50    (2006.01)
G06F 15/16    (2006.01)
G06F 15/173   (2006.01)
(Continued)

(52) U.S. Cl.
CPC ... *G06F 8/20* (2013.01); *G06F 8/35* (2013.01)

(58) Field of Classification Search
CPC . G06F 11/3624; G06F 12/109; G06F 13/387;
G06F 8/38; G06F 8/68; G06F 8/71; G06F
9/4401; G06F 9/5016; G06F 9/4443; G06F
9/44521; G06F 17/246; G06F 17/2223;
G06F 17/2276; G06F 17/30058
See application file for complete search history.

(56) References Cited

U.S. PATENT DOCUMENTS 7,523,450 B2 *    4/2009    Cardinell ................. 717/162
7,966,396 B2 *    6/2011    Sojian et al. ............. 709/224
(Continued)

FOREIGN PATENT DOCUMENTS

JP    7-160843 A    6/1995
JP    9-288568 A    11/1997
(Continued)

OTHER PUBLICATIONS

International Search Report dated Oct. 4, 2011 with English translation (five (5) pages).

*Primary Examiner* — Don Wong
*Assistant Examiner* — Anibal Rivera
(74) *Attorney, Agent, or Firm* — Crowell & Moring (57) ABSTRACT

The present invention includes four types of component diagrams, namely, an input/output data memory management component diagram, an input data value setup component diagram, a library execution component diagram, and an output data value acquisition component diagram, with respect to image processing library functions for a programming language and to an input/output data structure for the image processing library functions. The present invention also includes upper-level component diagrams, which are prepared by connecting the four types of component diagrams as lower-level component diagrams in the order of use, writes an algorithm by combining the lower- and upper-level component diagrams, and executes the written algorithm. From the written algorithm, the present invention generates a programming language source code for calling an image processing library.

17 Claims, 8 Drawing Sheets

(51) Int. Cl.
*G06F 13/28* (2006.01)
*G06F 3/048* (2013.01)
*G06F 9/44* (2006.01)

(56) References Cited

U.S. PATENT DOCUMENTS

8,001,183 B2 * 8/2011 Plewnia et al. ............... 709/204
2001/0025229 A1 * 9/2001 Moritz et al. ..................... 703/1
2004/0218208 A1 * 11/2004 Akiyoshi et al. ............. 358/1.15
2008/0005388 A1 * 1/2008 Hara ................................ 710/22
2010/0122233 A1 * 5/2010 Rath et al. ...................... 717/105
2011/0125448 A1 * 5/2011 Jung ............................ 715/783

FOREIGN PATENT DOCUMENTS

| JP | 2007-34489 A | 2/2007 |
| JP | 2007-79779 A | 3/2007 |
| JP | 2009-87144 A | 4/2009 |

* cited by examiner

```
//EDGE ANGLE EXTRACTION FUNCTION PROTOTYPE DECLARATION
int ExtractEdgeAngle
(IMGID imgSrc, EDGE_CTL*pEdgeCtl, TBL* pEdgeTbl);
```

```
//EDGE ANGLE EXTRACTION CONTROL STRUCTURE
typedef struct _EDGE_CTL{
  int minThr;  //EDGE INTENSITY LOWER THRESHOLD VALUE
  int maxEdge; //MAXIMUM NUMBER OF EDGES
}EDGE_CTL;
```

```
//EDGE ANGLE EXTRACTION RESULT STRUCTURE
typedef struct _EDGE_TBL{
  int x;     //X-COORDINATE
  int y;     //Y-COORDINATE
  int rho;   //EDGE INTENSITY VALUE
  int theta; //EDGE ANGLE VALUE
}EDGE_TBL;
```

```
//EDGE ANGLE QUANTIZATION FUNCTION  PROTOTYPE DECLARATION
int ResampleEdgeAngle(EDGE_TBL* pInEdgeTbl,EDGE_TBL*pOutEdgeTbl,
 int edgeCount, int resolution);
```

60 PROGRAMMING LANGUAGE SOURCE CODE

```
int sizeX = 640;
int sizeY = 480;
IMGID id1;
const int maxEdge = 1024;
const int minThr = 30;
const int resolution = 8;
EDGE_CTL*pEdgeCtl;
EDGE_TBL*pEdgeTbl;

id1 = AssignImg(sizeX,sizeY);

GrabImg(id1);

// ExtractEdgeAnglePkg
pEdgeCtl = (EDGE_CTL*)malloc(sizeof(EDGE_CTL)*1);
pEdgeTbl = (EDGE_TBL*)malloc(sizeof(EDGE_TBL)*maxEdge);
pEdgeCtl -> minThr = minThr;
pEdgeCtl -> maxEdge = maxEdge;
ExtractEdgeAngle(id1, pEdgeCtl, pEdgeTbl);

// ResampleEdgeAnglePkg
pOutEdgeTbl = (EDGE_TBL*)malloc(sizeof(EDGE_TBL)*maxEdge);
ResampleEdgeAnglePkg(pEdgeTbl, pOutEdgeTbl, resolution);

free(pEdgeCtl );
free(pEdgeTbl );
free(pOutEdgeTbl );
```

IMAGE PROCESSING SOFTWARE DEVELOPMENT METHOD, IMAGE PROCESSING SOFTWARE DEVELOPMENT DEVICE, AND IMAGE PROCESSING SOFTWARE DEVELOPMENT PROGRAM

TECHNICAL FIELD

The present invention relates to an image processing software development method, an image processing software development device, and an image processing software development program.

BACKGROUND ART

As the processing performance of an image processing system is enhanced, the field of application of the image processing system is now very broad. Although the image processing system was previously applied only to the field of factory automation (FA), it is now applied, for instance, to indoor/outdoor human monitoring, face recognition by a digital camera or the like, and external world recognition by a vehicle-mounted camera.

Meanwhile, as an enormous amount of data is to be processed in the development of the image processing system, a sufficiently high performance-to-cost ratio (or performance-to-power ratio) is not achieved when processing is performed by a general-purpose CPU (Central Processing Unit). As such being the case, an embedded LSI (Large Scale Integration) including an image processing hardware accelerator is frequently used. The embedded LSI is a circuit mounted in an embedded device. The embedded device performs image processing at high speed by using the embedded LSI.

Hence, it is necessary to develop recognition software by using a programming language library for implementing driver software operative in the embedded LSI. In the development of embedded device software, a programming language, such as the C language, is generally used. The driver software for the embedded LSI is similarly supplied as a programming language library. In most cases, therefore, recognition software developers inevitably perform programming in the programming language to develop the recognition software.

However, when programming is performed in the programming language, various problems, such as a large number of man-hours and a frequent human error, are encountered.

An existing technology providing an effective solution to the above problems is a model-based development technology.

Unlike conventional technologies for programming-language-based development, the model-based development technology uses, for example, the following approaches:
(a) To enumerate processing blocks predefined in a software development environment in the order of processing
(b) To connect software component diagrams defined similarly in the software development environment in a drawing By using the above approaches, the model-based development technology writes a software processing flow (hereinafter referred to as the model), allows the model to perform a simulated operation on a computer for verification purposes, and generates, in some cases, a programming language source code from the model. An example of the model-based development technology is described in Patent Literature 1. The example described in Patent Literature 1 relates to approach (a) above.

CITATION LIST

Patent Literature

Patent Literature 1: Japanese Unexamined Patent Application Publication No. 2009-087144

SUMMARY OF INVENTION

Technical Problem

However, the technology described in Patent Literature 1 cannot develop a recognition algorithm coordinated with an embedded LSI programming language library (or cannot generate a source code for calling the embedded LSI programming language library although it provides simulation in a PC or other development environment).

Further, in model-based development, the abstraction level of a software component, which is to be predefined, is often set to be higher than that of a programming language function. Therefore, it is difficult to reduce the amount of computer resources (calculation amount and memory use amount) for an embedded device, which are required for the execution of software components.

The present invention has been made in view of the above circumstances and has a main object to provide a model-based development environment into which a programming language library for an embedded LSI performing image processing is integrated. More specifically, the main object of the present invention is to provide a model-based development environment that makes it possible to develop a component diagram connection type recognition algorithm for use in a development environment (without using a programming language) and generate a source code by using a reduced amount of computer resources for an embedded device.

Solution to Problem

In order to solve the above-described problems, there is provided an image processing software development method that assists the development of software using a programming language library for an image processing device and is executed on an image processing software development device. The image processing software development device includes a storage device and a control device for configuring a model diagram editing section. The storage device includes a component diagram definition section to store an input/output data memory management component diagram, an input data value setup component diagram, a library execution component diagram, and an output data value acquisition component diagram as four types of lower-level component diagrams, which are elements of a model diagram descriptive of software. The lower-level component diagrams include a function of the programming language library and connection terminals for specifying the input/output data for executing the function. The storage device also stores upper-level component diagrams that are obtained by grouping the four types of lower-level component diagrams, which are connected through the connection terminals. The model diagram editing section prepares the model diagram by, upon receipt of an operation for adding the lower-level component diagrams or the upper-level component diagrams to the model diagram, adding the associated lower-level component diagrams or the associated upper-level component diagrams to the model diagram, and by, upon receipt of an operation for connecting the connection terminals of the lower-level component diagrams, connecting the associated connection terminals with a directional link.

The other means will be described later.

Advantageous Effects of Invention

The present invention makes it possible to provide a model-based development environment into which a programming language library for an embedded LSI performing image processing is integrated. More specifically, the present invention can provide a model-based development environment that makes it possible to develop a component diagram connection type recognition algorithm for use in a development environment (without using a programming language) and generate a source code by using a reduced amount of computer resources for an embedded device.

DESCRIPTION OF EMBODIMENTS

An embodiment of the present invention will now be described in detail with reference to the accompanying drawings.

Figure 1:
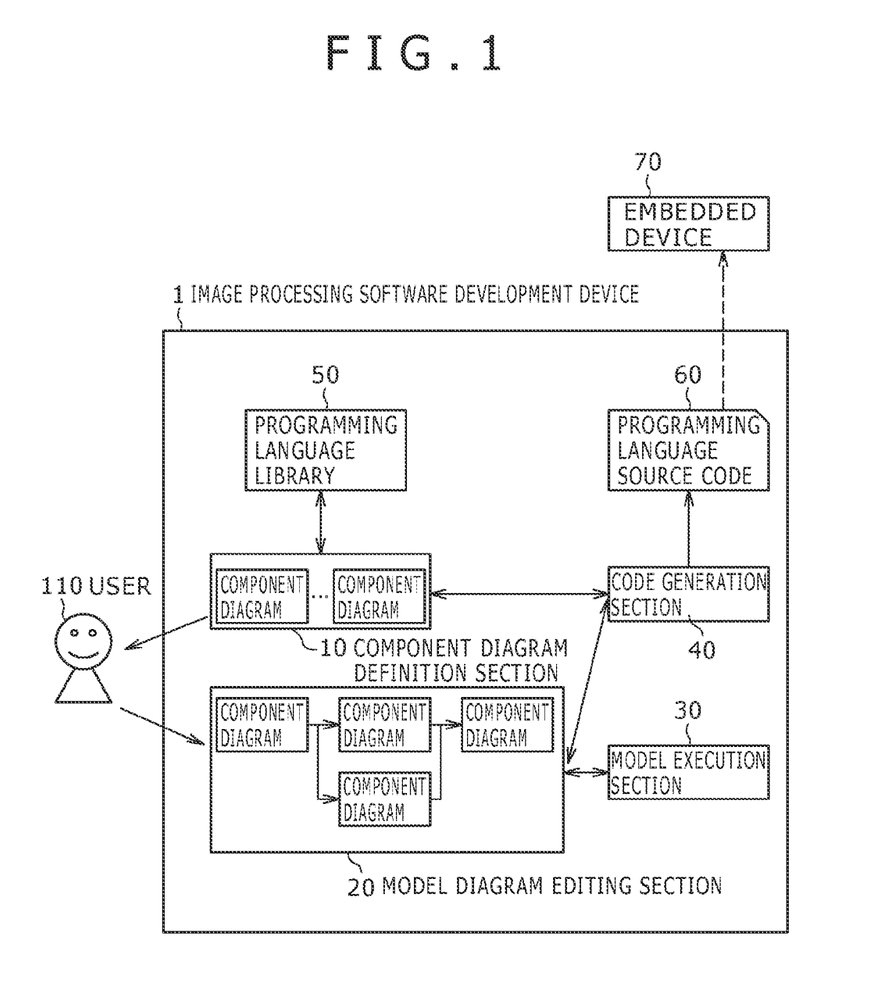
FIG. 1 is a diagram illustrating the configuration of an image processing software development system according to an embodiment of the present invention.

FIG. 1 is a diagram illustrating the configuration of an image processing software development system. The image processing software development system includes an image processing software development device 1 and an embedded device 70.

The image processing software development device 1 is configured as a computer that includes a CPU, a memory, a hard disk (storage means), and a network interface. The CPU acts as a control device. When the CPU executes a program loaded into the memory, the computer operates various processing sections.

The embedded device 70 is a computer in which an embedded LSI for performing image processing and the like is mounted. In most cases, the embedded device 70 has less computer resources (the CPU's processing capacity and the memory's storage capacity) than the image processing software development device 1.

The image processing software development device 1 includes a component diagram definition section 10, a model diagram editing section 20, a model execution section 30, a code generation section 40, a programming language library 50, and a programming language source code 60.

In the component diagram definition section 10, component diagrams corresponding to functions and data structures of the programming language library 50 are defined by using a predetermined structure. The structure will be described later. The functions of the programming language library 50 are hereinafter referred to as the library functions.

The model diagram editing section 20 writes an image processing flow by using the component diagrams defined in the component diagram definition section 10. Steps of writing the image processing flow will be described later.

Figure 6:
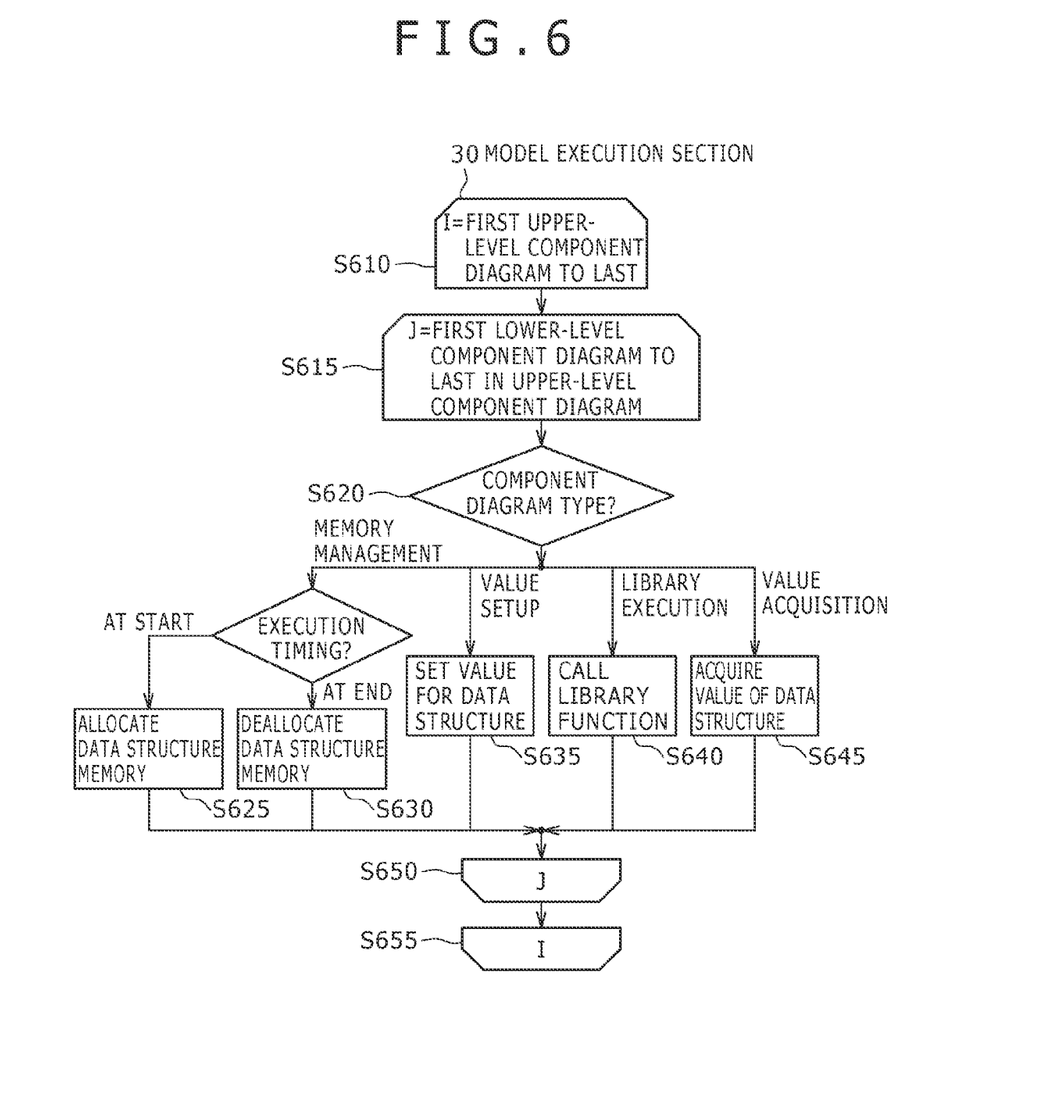
FIG. 6 is a flowchart illustrating a process performed by a model execution section according to the embodiment of the present invention.

The model execution section 30 executes the image processing flow in accordance with a model diagram prepared by using the model diagram editing section 20 (see FIG. 6 for details). More specifically, the model execution section 30 allows the embedded device 70 to perform a simulated operation on the image processing software development device 1 (this process is hereinafter referred to a simulation).

An example method of performing a simulated operation is to build the embedded device 70 as a virtual computer in the image processing software development device 1, simulate the hardware resources of the virtual computer and a process on the OS, and allow an image processing algorithm to perform a simulated operation.

Another example method of performing a simulated operation is to allow an image processing algorithm to perform a simulated operation on the hardware resources of the image processing software development device 1 and on the OS.

Figure 7:
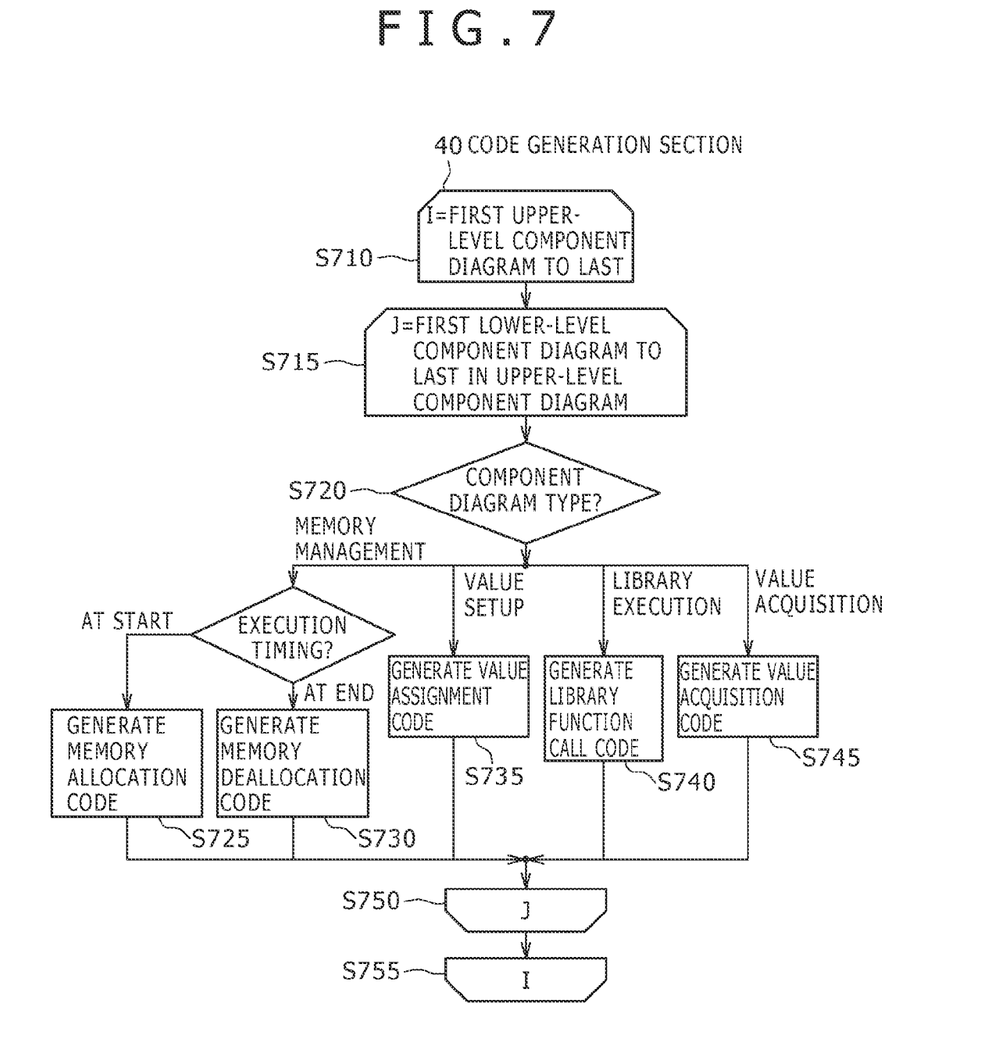
FIG. 7 is a flowchart illustrating a process performed by a code generation section according to the embodiment of the present invention.

The code generation section 40 generates the programming language source code 60 in accordance with the model diagram prepared by using the model diagram editing section 20 (see FIG. 7 for details). The generated programming language source code 60 is compiled and linked by a compiler for the embedded device 70 to prepare a binary file. The embedded device 70 receives the prepared binary file (see the broken-line arrow in FIG. 1) and operates the binary file by using the embedded LSI.

The programming language library 50 is a library for implementing driver software that runs on the embedded LSI mounted in the embedded device 70. In the description of the present embodiment, the programming language library 50 is exemplified by a library that is written in the C language to perform image processing (particularly an image recognition process such as an edge angle extraction process). Meanwhile, the present embodiment is applicable to various types of programming language libraries. For example, the present embodiment is also applicable to a voice recognition library. Further, the programming language that uses a library is not limited to the C language.

The programming language source code 60 is generated by the code generation section 40 and is an application source code for calling the programming language library 50.

A process performed by the image processing software development device 1 will now be described.

First of all, a user 110 disposes component diagrams, which are predefined in the component diagram definition section 10, on a model diagram screen of the model diagram editing section 20, and connects input/output terminals between the component diagrams to depict a model diagram indicative of an image processing flow.

Next, the user 110 instructs the model execution section 30 to execute the model diagram. The model execution section 30 then sequentially executes the first step to the last of the image processing flow depicted in the model diagram prepared by the model diagram editing section 20. In this instance, the image processing algorithm is simulated by sequentially calling the functions in the programming language library 50, which are associated with the component diagrams constituting the image processing flow.

Next, the user 110 instructs the code generation section 40 to generate a code. The code generation section 40 then outputs the programming language source code 60 in accordance with the image processing flow depicted in the model diagram prepared by the model diagram editing section 20.

Figure 2:
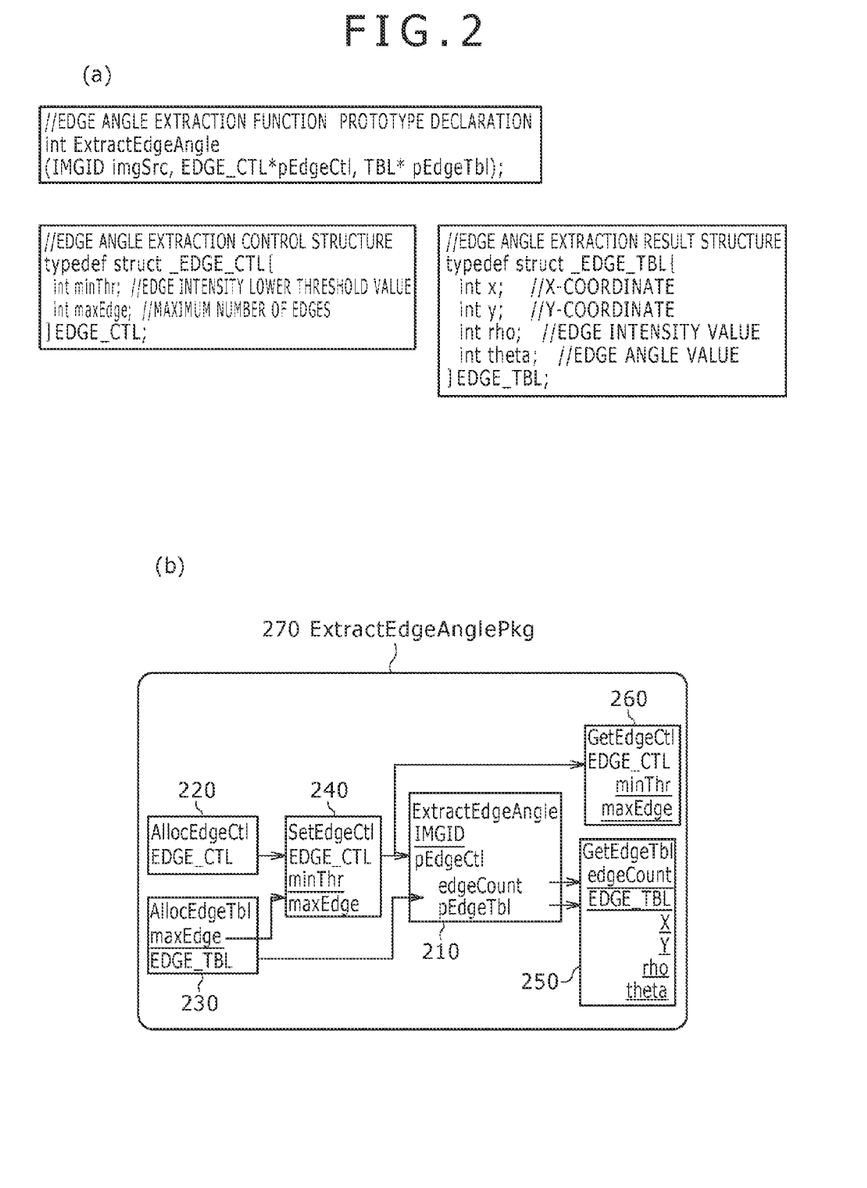
FIGS. 2A and 2B are diagrams illustrating component diagrams defined in a component diagram definition section according to the embodiment of the present invention.

FIGS. 2A and 2B are diagrams illustrating the component diagrams defined in the component diagram definition section 10.

FIG. 2A shows the functions and structures of the programming language library 50, which correspond to the lower-level component diagrams in FIG. 2B. First of all, a library function named "edge angle extraction function (ExtractEdgeAngle)" outputs the edge intensity and angle (rho, theta) of each pixel (x, y) to individual pixels in an image corresponding to an image ID (IMGID) specified by an argument. An edge angle extraction control structure (EDGE_CTL type) is a control parameter necessary for controlling the edge angle extraction process and has an edge intensity lower threshold value and a maximum number of edges.

The edge intensity and angle with respect to a pixel having an edge intensity higher than a specified threshold value are calculated in accordance with the control parameter, and output to an edge angle extraction result structure (EDGE_TBL) array. In this instance, it is assumed that an adequate number of edge angle extraction result structure arrays are provided (e.g., as needed to cover all on-screen pixels). Further, the number of edge angle extraction result structure arrays needs to be set by maxEdge, which is an edge angle extraction control structure member. It is also assumed that the number of actually extracted edges is used as the return value of the edge angle extraction function.

FIG. 2B shows not only the edge angle extraction function, which is one of the library functions, but also a group of component diagrams corresponding to that library function. The component diagrams include not only four types of lower-level component diagrams per library function, but also an upper-level component diagram. The upper-level component diagram is obtained by combining (grouping or hierarchizing) the lower-level component diagrams.

As regards label character strings in the component diagrams presented in the external view of the lower-level component diagrams, the upper character strings (e.g., ExtractEdgeAngle) represent the name of a lower-level component diagram, the left-hand character strings (e.g., IMGID) represent an input terminal, the right-hand character strings (e.g., edgeCount) represent an output terminal, and the character strings at the lateral center (e.g., pEdgeTbl) represent an input/output terminal.

Therefore, referring to FIGS. 2A and 2B, when the lower-level component diagrams are disposed from left to right in the order of use and connected in such a manner that the types of the input and output terminals match each other, the processing flow in the upper-level component diagram 270 is configured. In this instance, an underlined terminal (e.g., EDGE_TBL in GetEdgeTbl 250) serves as the input/output terminal of the upper-level component diagram.

The lower-level component diagrams are classified into four types (input/output data memory management component diagram, input data value setup component diagram, library execution component diagram, and output data value acquisition component diagram) as indicated below:

(a) The input/output data memory management component diagram is a lower-level component diagram for allocating/deallocating a data structure memory for each data structure to be input to or output from a library function. For example, AllocEdgeCtl 220, which exercises memory management (allocation and deallocation) for an EDGE_CTL structure, and AllocEdgeTbl 230, which exercises memory management for an EDGE_TBL structure, are classified under this category.

(b) The input data value setup component diagram is a lower-level component diagram for setting a value for an allocated data structure. For example, SetEdgeCtl 240, which sets a value for an EDGE_CTL structure that serves as a control structure for the edge angle extraction function, is classified under this category.

(c) The library execution component diagram is a lower-level component diagram for calling a library function. For example, ExtractEdgeAngle 210, which corresponds to the edge angle extraction function, is classified under this category. It should be noted that edgeCount in the ExtractEdgeAngle 210 is a return value of the edge angle extraction function. One library execution component diagram is defined for each library function.

(d) The output data value acquisition component diagram is a lower-level component diagram for acquiring a value from a data structure in which the result of execution of a library function is stored. For example, GetEdgeTbl 250, which acquires a value from an EDGE_TBL structure in which the result of edge angle extraction processing is stored, and GetEdgeCtl 260, which acquires a value from an EDGE_CTL structure, are classified under this category.

As regards the lower-level component diagrams 220-260 related to a data memory, one set of three different component diagrams, namely, (a) input/output data memory management component diagram, (b) input data value setup component diagram, and (d) output data value acquisition component diagram, is basically defined for each data type. As for the EDGE_CTL structure, for example, a set of the lower-level component diagrams 220, 240, 260 is defined.

However, if, as an exception, the data structure is dedicated to the output of a recognition result and no value needs to set, the input data value setup component diagram need not always be defined. For example, as for the EDGE_TBL structure, which is used only to receive the output of the edge angle extraction function (it means that the user 110 does not set a value), the input data value setup component diagram need not always be defined.

The upper-level component diagram 270 is obtained by connecting the lower-level component diagrams 210-260 in the order of use, combining them, and grouping them. In the present embodiment, the naming rule for the upper-level component diagram is assumed to be such that the name of the upper-level component diagram is formed by adding Pkg as a suffix to the name of the library execution component diagram (which is a lower-level component diagram). The suffix "Pkg" is an abbreviation for "package".

The present embodiment will be described in conjunction with the component diagrams related to a library function and its data structure. However, processing flow control component diagrams such as for a conditional branch or repetition may be added as the lower-level component diagrams to write a more complex algorithm.

A processing flow diagram to be disposed in the model diagram editing section 20 will now be described with reference to FIGS. 3A, 3B, 4A, 4B, and 5.

Figure 3:
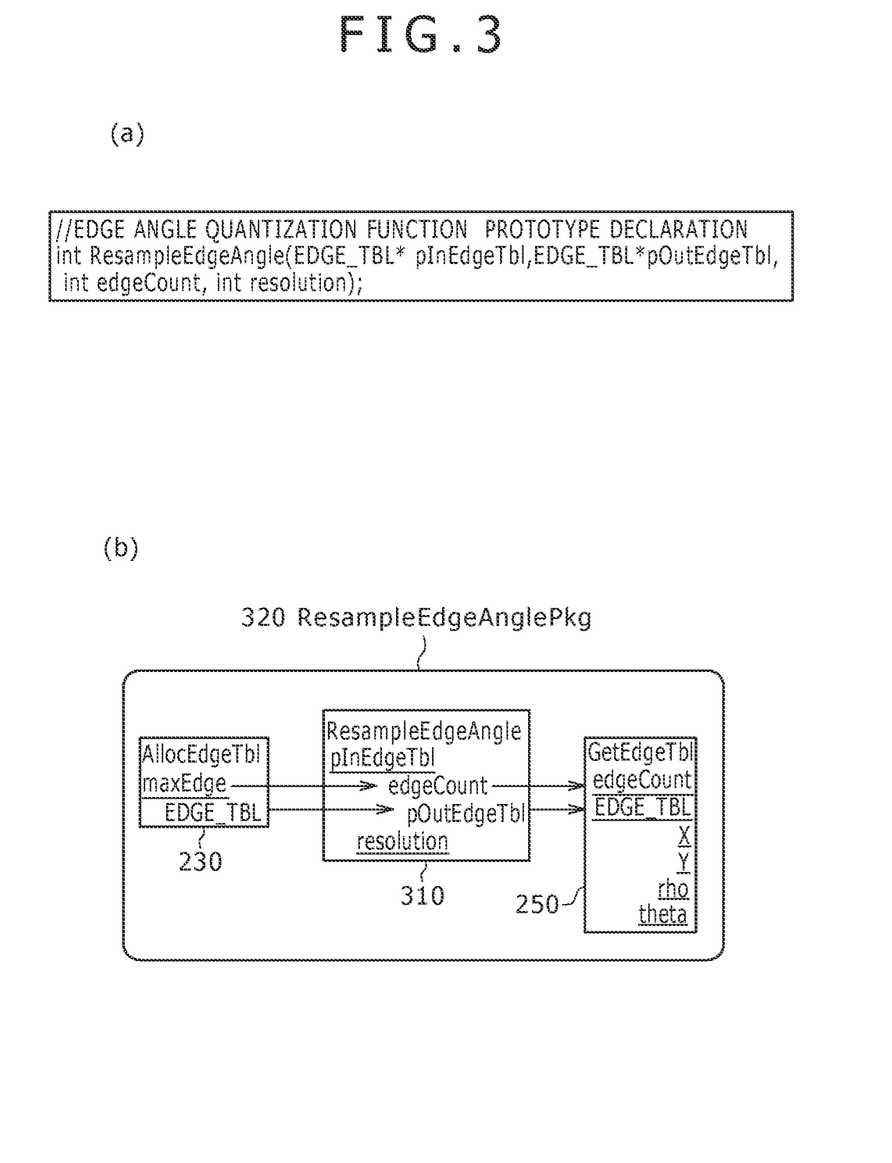
FIGS. 3A and 3B are diagrams illustrating an exemplary edge angle quantization function as another example of upper- and lower-level component diagrams defined in the component diagram definition section according to the embodiment of the present invention.

FIGS. 3A and 3B are diagrams illustrating an exemplary edge angle quantization function as another example of upper- and lower-level component diagrams defined in the component diagram definition section 10.

FIG. 3A shows an edge angle quantization function (ResampleEdgeAngle), which is a library function corresponding to the lower-level component diagrams shown in FIG. 3B. Edge angle quantization is a process for converting edge angle information, which is output to the EDGE_TBL structure in increments of 1 degree over a 360-degree range by the edge angle extraction process, into a specified angular resolution (into an 8-direction resolution in increments of 45 degrees over a 360-degree range if, for instance, an 8-direction code is used). This process is used, for instance, to extract an image recognition feature amount in accordance with edge angle information.

The edge angle quantization function (ResampleEdgeAngle) inputs an edge angle extraction result structure (EDGE_TBL) array, which is output from the edge angle extraction function processed in the preceding stage, from a first argument pInEdgeTbl, inputs, as control input information, the number of EDGE_TBL structure arrays to a third argument edgeCount and a resolution prevailing after quantization to a fourth argument resolution, performs an edge angle quantization process, inputs the result of processing to another edge angle extraction result structure (EDGE_TBL) array, which is received from a second argument as output, and outputs the resulting edge angle extraction result structure (EDGE_TBL) array. It should be noted that the number of edge angle quantization tables obtained after quantization is a return value of the function.

In FIG. 3B, ResampleEdgeAngle 310, which is related to the edge angle quantization function, corresponds to the library execution component diagram, and the other input/output data types are the same as those in FIGS. 2A and 2B. Therefore, the component diagrams defined in the component diagram definition section 10 may be used as the lower-level component diagrams 230, 250. An upper-level component diagram 320 is obtained by connecting the lower-level component diagrams 230, 310, 250 in the order of use, combining them, and grouping them.

Figure 4:
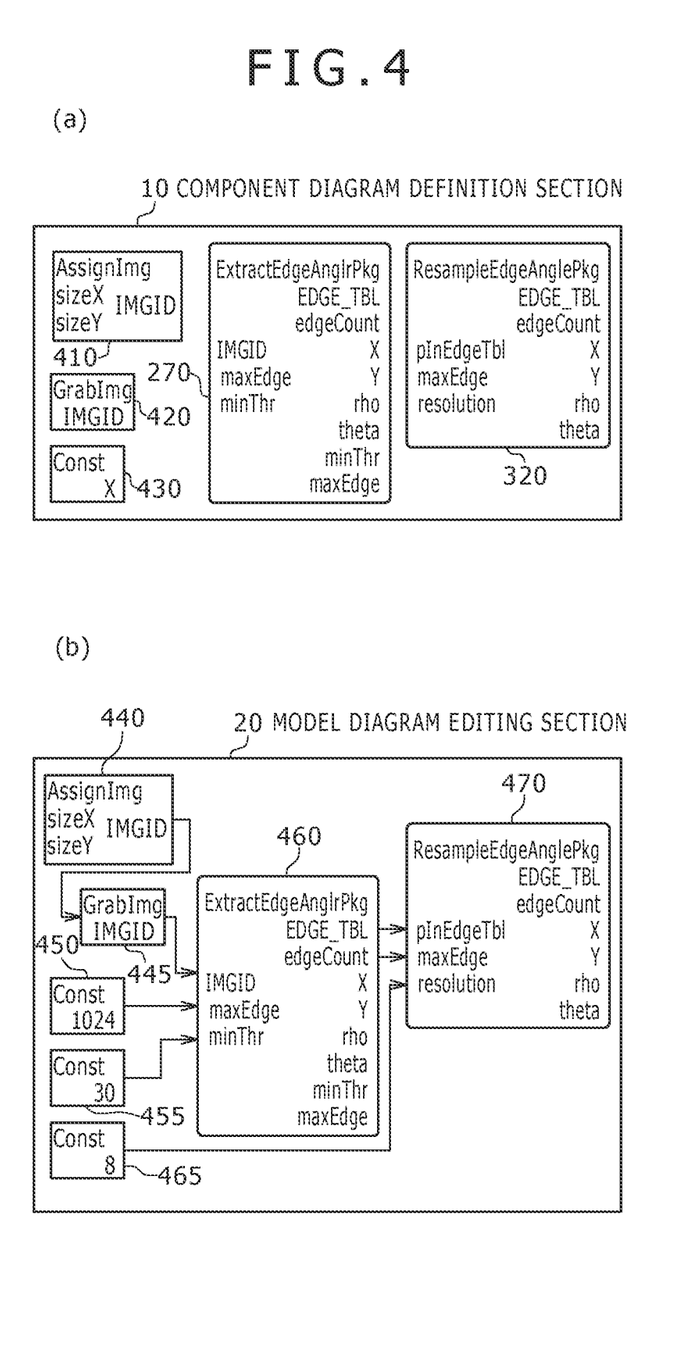
FIGS. 4A and 4B are diagrams illustrating an example in which the upper-level component diagrams depicted in FIGS. 2A, 2B, 3A, and 3B concerning the embodiment of the present invention are disposed and connected on a model diagram screen of a model diagram editing section.

FIGS. 4A and 4B are diagrams illustrating an example in which the upper-level component diagrams depicted in FIGS. 2A, 2B, 3A, and 3B are disposed and connected on the model diagram screen of the model diagram editing section 20.

When writing an algorithm in the present embodiment, the user 110 selects component diagrams for use in an image processing algorithm processing flow from the component diagrams defined in the component diagram definition section 10 shown in FIG. 4A, disposes the selected component diagrams on the model diagram editing section 20 shown in FIG. 4B, and connects the connection terminals of the component diagrams in the order of use (which corresponds to the later-described order of processing depicted in FIGS. 6 and 7) and in such a manner as to achieve type consistency.

First of all, the user 110 selects AssignImg 410 (image memory allocation), which is defined in the component diagram definition section 10, by, for example, dragging the mouse, and disposes the selected AssignImg 410 (image memory allocation) on the model diagram editing section 20 as a lower-level component diagram 440 by, for example, dropping the mouse. In other words, each component diagram defined in the component diagram definition section 10 is the definition information about a component. The component diagrams do not function as a real component diagram until they are disposed on the model diagram editing section 20.

Next, the user 110 similarly disposes the remaining component diagrams. More specifically, the user 110 acquires an image and loads it into an allocated image memory (from a component diagram 420 to a component diagram 445), sets a maximum number of acquired edges (maxEdge=1024) and an edge intensity threshold value (minThr=30), which are control parameter constant values (from a component diagram 430 to component diagrams 450, 455), and inputs them to achieve edge angle extraction (ExtractEdgeAnglePkg) (from a component diagram 270 to a component diagram 460).

Further, the user 110 disposes component diagrams for setting an angular resolution (resolution=8), which is a control parameter constant value (from a component diagram 430 to a component diagram 465), and quantizing the result of edge angle extraction (ResampleEdgeAngle) (from a component diagram 320 to a component diagram 470). Subsequently, the user 110 connects the input and output terminals of the component diagrams to build an image processing flow.

As described above, the upper-level component diagrams are defined in the component diagram definition section 10 by combining the connection relations between the lower-level component diagrams. Therefore, the user 110 simply has to connect only input information and output information about the entire processing flow formed by the lower-level component diagrams to the upper-level component diagrams 460, 470 on the model diagram editing section 20. This makes it possible to reduce the number of component diagrams to be connected. Consequently, when, for instance, an algorithm is to be produced experimentally, the above-described feature is effective for promptly building many algorithms and comparing them for evaluation purposes.

Figure 5:
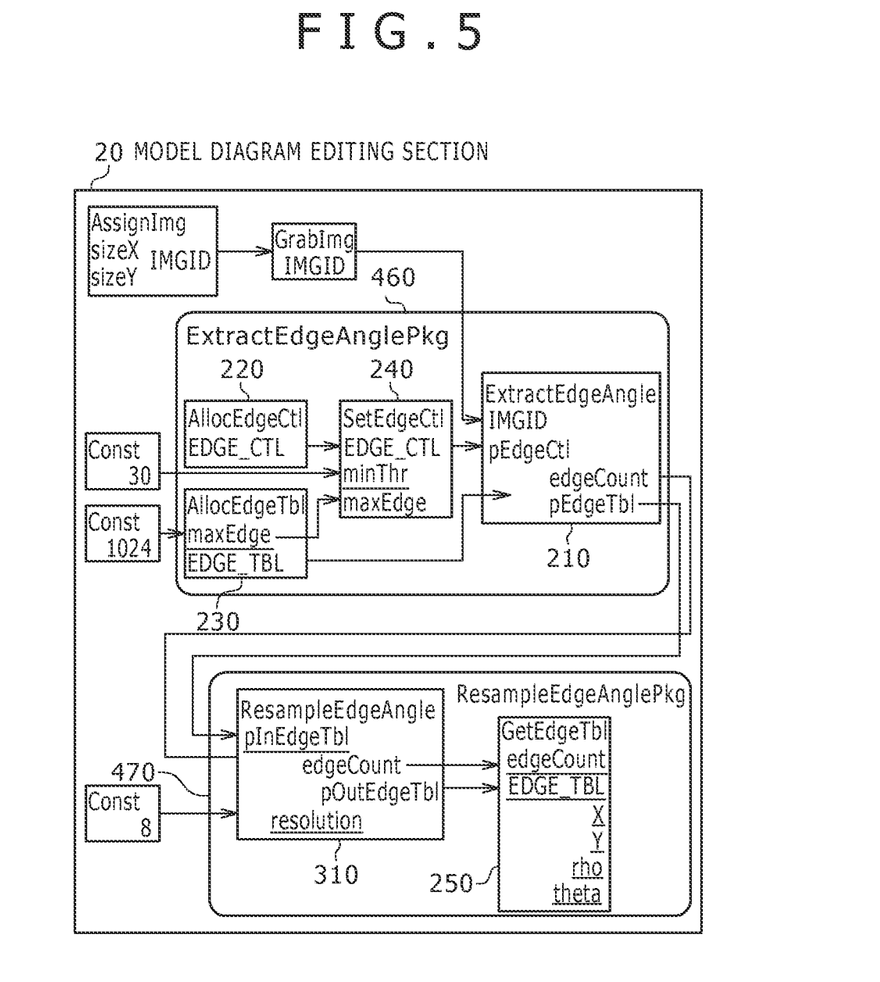
FIG. 5 is a diagram illustrating an example in which the same processing flow as the one shown in FIGS. 4A and 4B concerning the embodiment of the present invention is built by using the upper- and lower-level component diagrams.

FIG. 5 is a diagram illustrating an example in which the same processing flow as the one shown in FIGS. 4A and 4B is built by using the upper- and lower-level component diagrams. In the example shown in FIG. 5, the user 110 first writes the same processing flow as the one shown in FIGS. 4A and 4B by using upper-level component diagrams. Next, the user 110 displays lower-level component diagrams included in the upper-level component diagrams. A publicly known method of display status switching may be used. For example, a component diagram editing menu or the like may be used to display or hide the lower-level component diagrams. A different screen may be opened by double-clicking an upper-level component diagram.

After the lower-level component diagrams are displayed, the user 110 can edit the connection relations between the lower-level component diagrams. Therefore, the user 110 can check the lower-level component diagrams included in the upper-level component diagrams, delete a duplicate lower-level component diagram or a lower-level component diagram requiring no processing (or correct the connection relations as needed to skip a certain process), and reconnect the lower-level component diagrams.

Hence, upon receipt of a connecting operation relative to a connection terminal of the library execution component diagram in the second upper-level component diagram in the model diagram from a connection terminal of the input/output data memory management component diagram in the first upper-level component diagram in the model diagram, the model diagram editing section 20 adds to the model diagram a directional link from the connection terminal of the input/output data memory management component diagram to the connection terminal of the library execution component diagram in accordance with the received connecting operation.

For example, if the lower-level component diagram 230 (AllocEdgeTbl) included in the upper-level component diagram 270 shown in FIGS. 2A, 2B is a duplicate of the lower-level component diagram 230 (AllocEdgeTbl) included in the upper-level component diagram 320 shown in FIGS. 3A and 3B, and the upper-level component diagrams 460, 470 are interconnected as shown in FIGS. 4A and 4B, the EDGE_TBL structure memory is doubly allocated. In the example shown in FIG. 5, therefore, the user 110 rewrites the connection relations in such a manner that the EDGE_TBL structure memory allocated by the lower-level component diagram 230 in the upper-level component diagram 460 is used as is in the upper-level component diagram 470 in the subsequent stage.

Further, the EDGE_CTL structure value acquisition component diagram 260 (GetEdgeCtl) and the EDGE_TBL structure value acquisition component diagram 250 (GetEdgeTbl), which are located in the final stage of the processing flow within the upper-level component diagram 460, are unnecessary processes. Therefore, the user 110 rewrites the connection relations in such a manner that the result output from the edge angle extraction function execution component diagram 210 (ExtractEdgeAngle) is input as is to the edge angle quantization function execution component diagram 310 (ResampleEdgeAngle).

As described above, the user 110 can display and edit the lower-level component diagrams defined in an upper-level component diagram through the model diagram editing section 20. Therefore, it is possible to improve the efficiency in the use of computer resources of the embedded device 70 in which an algorithm completed through simulation operates. More specifically, it is possible to reduce the amount of memory allocated for the embedded device 70 and shorten the processing time required for a memory allocation process for the embedded device 70.

FIG. 6 is a flowchart illustrating a process performed by the model execution section 30.

The model execution section 30 basically processes the component diagrams in the processing flow built in the model diagram editing section 20 in the order from the first component diagram to the last (steps S610, S615, S650, and S655). In this instance, the processing flow for an upper hierarchical layer formed by connecting the upper-level component diagrams (this processing flow corresponds to the example shown in FIGS. 4A and 4B) is first checked to determine the processing order in which the component diagrams are to be processed (the order from the first component diagram to the last). Next, the processing flow for a lower hierarchical layer formed by connecting the lower-level component diagrams defined in each upper-level component diagram (this processing flow corresponds to the example shown in FIG. 5) is checked to determine the processing order in which the component diagrams are to be processed (the order from the first component diagram to the last).

The processing flow in FIGS. 4A and 4B will now be described as a concrete example.

First of all, the processing order in which the upper-level component diagrams are to be processed is determined. When the processing flow is checked sequentially from the first component diagram to the last, the component diagrams included in a first component diagram group shown in the example of FIGS. 4A and 4B are in the following order:

<Component diagram 440→component diagram 445→component diagram 450→component diagram 455→component diagram 460→component diagram 465→component diagram 470>

The component diagrams 450, 455, which are parallel to each other, are to be processed before the component diagram 465, which is to be processed in the subsequent stage. However, the component diagrams 450, 455 may be processed in any order. For example, the order in which such parallel component diagrams are to be processed may be determined so that they are processed in the order in which they are disposed in the model diagram editing section 20.

Next, the processing order in which the lower-level component diagrams are to be processed is determined. First of all, as regards the upper-level component diagram 465, the processing flow shown in FIGS. 2A and 2B indicates that the component diagrams included in a second component diagram group are in the following order:

<Component diagram 220→component diagram 230→component diagram 240→component diagram 210→component diagram 250→component diagram 260>

The component diagrams parallel to each other are to be processed in the same order as described earlier.

Next, as regards the upper-level component diagram 470, the processing flow shown in FIGS. 3A and 3B indicates that the component diagrams included in a third component diagram group are in the following order:

<Component diagram 230→component diagram 310→component diagram 250>

The component diagrams parallel to each other are to be processed in the same order as described earlier.

When the above-described orders are combined, the component diagrams are to be processed in the following order. The term "combine" refers to replacing the upper-level component diagrams 465, 470 in the first component part group by the aforementioned lower-level component diagram groups (the second and third component diagram groups):

<Component diagram 440→component diagram 445→component diagram 450→component diagram 455→component diagram 460→component diagram 220→component diagram 230→component diagram 240→component diagram 210→component diagram 250→component diagram 260→component diagram 230→component diagram 310→component diagram 250>

Next, the component diagrams are processed in the processing order. In the processing of each component diagram, the component diagram type is first checked (step S620) so that the processing branches in accordance with the component diagram type.

If the component diagram type is an input/output data memory management component diagram, branching occurs depending on whether the execution timing is at the start or end of the processing flow. If the execution timing is at the start of the processing flow, the memory for the data structure is allocated (step S625). If, on the other hand, the execution timing is at the end of the processing flow, the memory for the data structure is deallocated (step S630).

If the component diagram type is an input data value setup component diagram, a specified value is set for the associated data structure (step S635). The data structure to be used and the setting (the value to be set) to be used are specified from the input terminal of the component diagram.

If the component diagram type is a library execution component diagram, the associated library function is called to receive the result of execution (step S640). The arguments to be passed to the library function (input argument and output argument) are specified from the input terminal of the component diagram. The data structure for retaining the result of execution of the library function and the return value of the library function are output from the output terminal.

If the component diagram type is an output data value acquisition component diagram, a value is acquired from the associated data structure (step S645). The data structure of an acquisition source, a data element to be acquired, and the data structure of a storage destination at which an acquired result is to be stored are specified from the input terminal of the component diagram. The data structure of the storage destination is output from the output terminal.

In the present embodiment, the input/output data memory management component diagram simulates the function of a garbage collector, which reclaims unused memory. However, this feature is not essential to the present embodiment. If, for example, the garbage collector function is not available, an alternative is to divide the input/output data memory management component diagram into two types, namely, an input/output data memory allocation component diagram and an input/output data memory deallocation component diagram, and connect the input/output data memory deallocation component diagram to an appropriate spot of the processing flow built in the model diagram editing section 20 (generally the end of the processing flow).

The present embodiment is described in conjunction with the component diagrams related to the library functions and their data structures. However, if a processing flow control component diagram such as for a conditional branch or repetition is added as a lower-level component diagram, the number of processing branch destinations for step S620 is increased for each component diagram type. A conventional method of component diagram execution may be used at a branch destination. If, for example, the component diagram type is a processing branch component diagram, processing is performed in accordance with a conditional judgment and with a judgment result.

FIG. 7 is a flowchart illustrating a process performed by the code generation section 40.

The code generation section 40 basically processes the component diagrams in the processing flow built in the model diagram editing section 20 in the order from the first component diagram to the last (steps S710, S715, S750, and S755). In this instance, the processing flow for an upper hierarchical layer formed by connecting the upper-level component diagrams (this processing flow corresponds to the example shown in FIGS. 4A and 4B) is first checked to determine the processing order in which the component diagrams are to be processed (the order from the first component diagram to the last). Next, the processing flow for a lower hierarchical layer formed by connecting the lower-level component diagrams defined in each upper-level component diagram (this processing flow corresponds to the example shown in FIG. 5) is checked to determine the processing order in which the component diagrams are to be processed (the order from the first component diagram to the last). Subsequently, the individual component diagrams are processed in the processing order.

In the processing of each component diagram, the component diagram type is first checked (step S720) so that the processing branches in accordance with the component diagram type.

If the component diagram type is an input/output data memory management component diagram, branching occurs depending on whether the execution timing is at the start or end of the processing flow. If the execution timing is at the start of the processing flow, a source code for allocating the memory for the data structure (e.g., a malloc statement if the C language is used) is generated (step S725). If, on the other hand, the execution timing is at the end of the processing flow, a source for deallocating the memory for the data structure (e.g., a free statement if the C language is used) is generated (step S730).

If the component diagram type is an input data value setup component diagram, a source code for setting a specified value for the associated data structure (e.g., an assignment statement for a structure member variable if the C language is used) is generated (step S735). The data structure to be used and the setting (the value to be set) to be used are specified from the input terminal of the component diagram.

If the component diagram type is a library execution component diagram, the associated library function is called to generate a source code for receiving the result of execution (step S740). The arguments to be passed to the library function (input argument and output argument) are specified from the input terminal of the component diagram. The data structure for retaining the result of execution of the library function and the return value of the library function are output from the output terminal.

If the component diagram type is an output data value acquisition component diagram, a source code for acquiring a value from the associated data structure (e.g., assignment for a variable different from an acquisition source data structure) is generated (step S745). However, if the output terminal of the output data value acquisition component diagram is not connected, the source code concerning such a terminal is not generated because it is concluded that there is no destination for storing the acquired value. The data structure of an acquisition source, a data element to be acquired, and the data structure of a storage destination at which an acquired result is to be stored are specified from the input terminal of the component diagram. The data structure of the storage destination is output from the output terminal.

Figure 8:
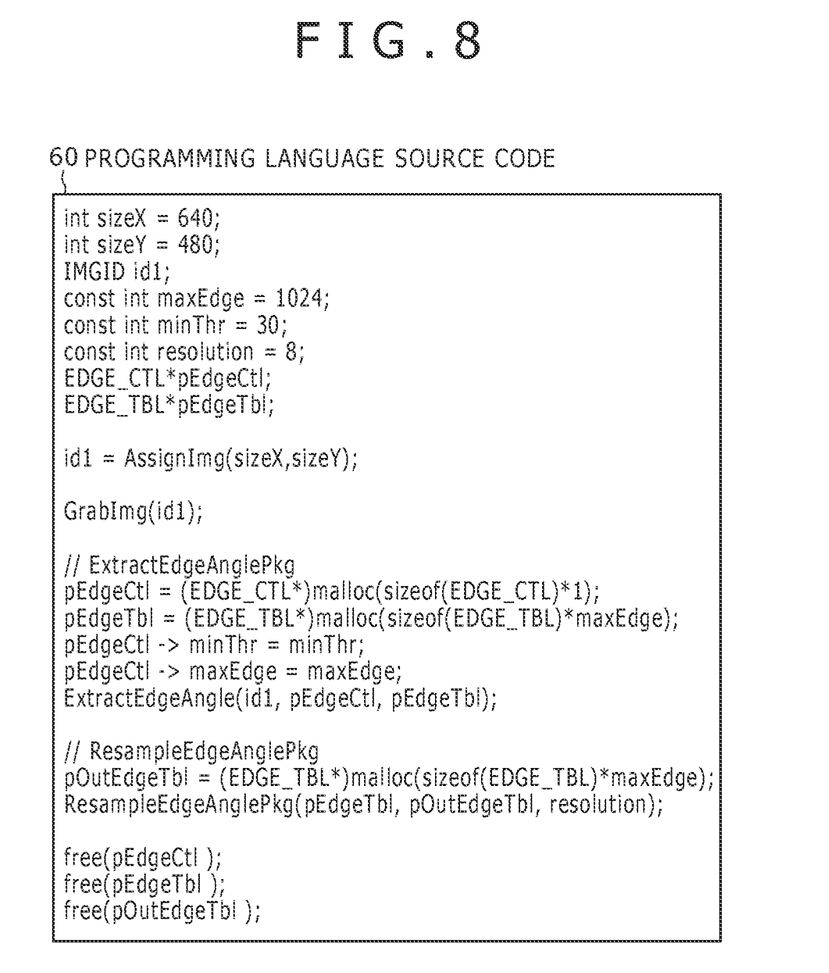
FIG. 8 is a diagram illustrating the result of code generation with respect to the processing flow shown in FIGS. 4A and 4B as an example of a programming language source code according to the embodiment of the present invention.

FIG. 8 is a diagram illustrating the result of code generation with respect to the processing flow shown in FIGS. 4A and 4B as an example of the programming language source code 60. In FIG. 8, "sizeX=640" and "sizeY=480" are presented as an example in which parameters are given from the outside of a model.

In the present embodiment, the name of a variable is determined on the basis of an input/output terminal name in each component diagram. Alternatively, however, another method of variable name determination may be used. For example, an alternative is to assign a name to a connection line between component diagrams and use that name as a variable name.

The present embodiment is described by explaining about the component diagrams related to the library functions and their data structures. However, if a processing flow control component diagram such as for a conditional branch or repetition is added as a lower-level component diagram, the number of processing branch destinations for step S720 is increased for each component diagram. A conventional method of code generation processing may be used at a branch destination. If, for example, the component diagram type is a processing branch component diagram, code generation processing is performed in accordance with a conditional judgment statement and with a judgment result (an if-else statement is generated if the C language is used).

The present embodiment, which has been described above, relates to a model-based development technology for writing a software process by connecting component diagrams instead of using a programming language. Particularly, the present embodiment relates to a model-based development technology for software that achieves recognition with an image sensor.

The image processing software development device 1 according to the present embodiment has four types of component diagrams, namely, the input/output data memory management component diagram, the input data value setup component diagram, the library execution component diagram, and the output data value acquisition component diagram, with respect to the image processing library functions for a programming language and to the input/output data structure for the image processing library functions. The image processing software development device 1 according to the present embodiment also has an upper-level component diagram, which is obtained by combining the above four types of component diagrams as the lower-level component diagrams, and writes software by combining the upper- and lower-level component diagrams.

The image processing software development device 1 according to the present embodiment has component diagram connection terminals, which correspond to input/output arguments of the image processing library functions, as the above-mentioned component diagrams. The input/output variable names or data type names of the image processing library functions are used as the names of the connection terminals. Further, the image processing software development device 1 according to the present embodiment has a function of using a programming language to output a source code for calling an image processing library function associated with component diagrams forming a software processing flow diagram from the software processing flow diagram written by using the image processing software development device 1.

The image processing software development device 1 according to the present embodiment has a structure for connecting a memory area allocated by the input/output data memory management component diagram included in a lower hierarchical layer of a certain upper-level component diagram to the library execution component diagram included in a lower hierarchical layer of another upper-level component diagram.

When the input/output data structure is a structure of image data, the image processing software development device 1 according to the present embodiment performs image data management information input/output operations relative to the component diagram connection terminals, and manages pixel data, which is included in the image data, within the programming language library 50.

In other words, when the data structure input to or output from a library function is a structure of image data, the associated connection terminal is connected to a connection terminal of a lower-level component diagram that inputs or outputs image data management information, and the pixel data included in the image data is managed within an image processing library.

The present embodiment is configured by a software development device that executes an image processing software development program and a relevant computer program on a computer. The image processing software development program and the computer program are obtained by implementing a data memory management method by performing an area allocation/area deallocation process with respect to a storage device of the computer, by implementing a data input/output method by performing an input/output process with respect to the storage device of the computer, and by implementing a data process by causing the computer to perform an arithmetic process.

The present embodiment enables an image processing software developer to design and implement an image processing algorithm by connecting the component diagrams and without performing programming with a programming language.

Further, the present embodiment makes it possible to generate a code for calling the programming language library 50 for an embedded LSI from a designed and implemented model diagram by using an automatic code generation function. In this instance, the upper- and lower-level component diagrams can be used in combination to generate a source code by using a reduced amount of computer resources.

When model-based development is conducted by connecting the upper-level component diagrams at an experimental production stage of an algorithm, the algorithm can be developed by a component diagram connection method, which provides a higher abstraction level than the use of a programming language, that is, reduces the volume of implementation. Further, after the algorithm is completed, the connection relations between the lower-level component diagrams may be improved to achieve implementation in such a manner as to enhance the processing efficiency of the embedded device 70 and the efficiency in the use of memory.

Furthermore, when automatic code generation is conducted, it is possible to generate not only a code for allocating or deallocating memory for each data structure, substituting a value, and acquiring a value, but also a code for calling a predefined library function for an embedded LSI. This makes it possible to develop image processing software without performing programming with a programming language. In other words, model-based development can be achieved with the programming language library 50 consolidated.

In a computer environment where processing is performed in accordance with the present embodiment, one processing means according to the present embodiment may be implemented by dividing it into two processing means, and two or more processing means according to the present embodiment may be implemented by combining them into one processing means. The form of implementation is not specifically limited as far as the functionality offered by the present embodiment remains unimpaired.

LIST OF REFERENCE SIGNS

1 . . . Image processing software development device
10 . . . Component diagram definition section
20 . . . Model diagram editing section
30 . . . Model execution section
40 . . . Code generation section
50 . . . Programming language library
60 . . . Programming language source code
70 . . . Embedded device

The invention claimed is:

1. An image processing software development method that assists the development of software using a programming language library for an image processing device and is executed on an image processing software development device,
wherein the image processing software development device includes a storage device and a control device for configuring a model diagram editing section,
wherein the storage device includes a component diagram definition section to store an input/output data memory management component diagram, an input data value setup component diagram, a library execution component diagram, and an output data value acquisition component diagram as four types of lower-level component diagrams, which are elements of a model diagram descriptive of software; wherein the lower-level component diagrams include a function of the programming language library and connection terminals for specifying the input/output data for executing the function, wherein the storage device further stores upper-level component diagrams that are obtained by grouping the four types of lower-level component diagrams, which are connected through the connection terminals, and wherein the model diagram editing section prepares the model diagram by, upon receipt of an operation for adding the lower-level component diagrams or the upper-level component diagrams to the model diagram, adding the associated lower-level component diagrams or the associated upper-level component diagrams to the model diagram, and by, upon receipt of an operation for connecting the connection terminals of the lower-level component diagrams, connecting the associated connection terminals with a directional link.

2. The image processing software development method according to claim 1, the control device for the image processing software development device further configuring a model execution section, the method comprising:

causing the model execution section to identify the order of processing of the component diagrams from connection relations between the component diagrams in the prepared model diagram and select, one by one, the lower-level component diagrams in the prepared model diagram in the order of processing;

when the selected lower-level component diagram is the input/output data memory management component diagram, causing the model execution section to allocate and deallocate memory for a data structure to be input to or output from a library function in the programming language library;

when the selected lower-level component diagram is the input data value setup component diagram, causing the model execution section to set a value of a data structure to be input to or output from the library function with respect to the allocated memory;

when the selected lower-level component diagram is the library execution component diagram, causing the model execution section to reference the value of a data structure to be input to or output from the library function and call the programming language library; and when the selected lower-level component diagram is the output data value acquisition component diagram, causing the model execution section to read the result of execution from a data structure storing the result of execution that is obtained when the programming language library is called.

3. The image processing software development method according to claim 1, the control device for the image processing software development device further configuring a code generation section, the method comprising:

causing the code generation section to identify the order of processing of the component diagrams from connection relations between the component diagrams in the prepared model diagram and select, one by one, the lower-level component diagrams in the prepared model diagram in the order of processing;

when the selected lower-level component diagram is the input/output data memory management component diagram, causing the code generation section to output the programming language source code for allocating and deallocating memory for a data structure to be input to or output from a library function in the programming language library from memory in the image processing device;

when the selected lower-level component diagram is the input data value setup component diagram, causing the code generation section to output the programming language source code for setting a value of a data structure to be input to or output from the library function with respect to the memory allocated in the image processing device;

when the selected lower-level component diagram is the library execution component diagram, causing the code generation section to reference the value of a data structure to be input to or output from the library function and output the programming language source code for calling the programming language library in the image processing device; and when the selected lower-level component diagram is the output data value acquisition component diagram, causing the code generation section to output the programming language source code for reading the result of execution from a data structure storing the result of execution that is obtained when the programming language library is called in the image processing device.

4. The image processing software development method according to claim 1, wherein, upon receipt of an operation for connecting the connection terminals of the input/output data memory management component diagram in a first one of the upper-level component diagrams in the model diagram to the connection terminals of the library execution component diagram in a second one of the upper-level component diagrams in the model diagram, the model diagram editing section adds to the model diagram a directional link from the connection terminals of the input/output data memory management component diagram to the connection terminals of the library execution component diagram in accordance with the received connecting operation.

5. The image processing software development method according to claim 1, comprising:

when the data structure to be input to or output from the library function is a structure of image data, connecting the associated connection terminals to the connection terminals of the lower-level component diagrams for inputting or outputting management information about the image data, and managing pixel data included in the image data within an image processing library.

6. The image processing software development method according to claim 2, wherein, upon receipt of an operation for connecting the connection terminals of the input/output data memory management component diagram in a first one of the upper-level component diagrams in the model diagram to the connection terminals of the library execution component diagram in a second one of the upper-level component diagrams in the model diagram, the model diagram editing section adds to the model diagram a directional link from the connection terminals of the input/output data memory management component diagram to the connection terminals of the library execution component diagram in accordance with the received connecting operation.

7. The image processing software development method according to claim 3, wherein, upon receipt of an operation for connecting the connection terminals of the input/output data memory management component diagram in a first one of the upper-level component diagrams in the model diagram to the connection terminals of the library execution component diagram in a second one of the upper-level component diagrams in the model diagram, the model diagram editing section adds to the model diagram a directional link from the connection terminals of the input/output data memory management component diagram to the connection terminals of the library execution component diagram in accordance with the received connecting operation.

8. The image processing software development method according to claim 2, comprising:
when the data structure to be input to or output from the library function is a structure of image data, connecting the associated connection terminals to the connection terminals of the lower-level component diagrams for inputting or outputting management information about the image data, and managing pixel data included in the image data within an image processing library.

9. The image processing software development method according to claim 3, comprising:
when the data structure to be input to or output from the library function is a structure of image data, connecting the associated connection terminals to the connection terminals of the lower-level component diagrams for inputting or outputting management information about the image data, and managing pixel data included in the image data within an image processing library.

10. An image processing software development program for causing the image processing software development device, which is a computer, to execute the image processing software development method according to claim 2.

11. An image processing software development program for causing the image processing software development device, which is a computer, to execute the image processing software development method according to claim 3.

12. An image processing software development program for causing the image processing software development device, which is a computer, to execute the image processing software development method according to claim 4.

13. An image processing software development program for causing the image processing software development device, which is a computer, to execute the image processing software development method according to claim 5.

14. An image processing software development device that assists the development of software using a programming language library for an image processing device, the image processing software development device comprising:
a storage device; and
a control device for configuring a model diagram editing section,
wherein the storage device includes a component diagram definition section that stores an input/output data memory management component diagram, an input data value setup component diagram, a library execution component diagram, and an output data value acquisition component diagram as four types of lower-level component diagrams, which are elements of a model diagram descriptive of software,
wherein the lower-level component diagrams include a function of the programming language library and connection terminals for specifying the input/output data for executing the function,
wherein the storage device further stores upper-level component diagrams that are obtained by grouping the four types of lower-level component diagrams, which are connected through the connection terminals, and
wherein the model diagram editing section prepares the model diagram by, upon receipt of an operation for adding the lower-level component diagrams or the upper-level component diagrams to the model diagram, adding the associated lower-level component diagrams or the associated upper-level component diagrams to the model diagram, and by, upon receipt of an operation for connecting the connection terminals of the lower-level component diagrams, connecting the associated connection terminals with a directional link.

15. The image processing software development device according to claim 14, wherein the control device for the image processing software development device further configures a model execution section, and wherein the model execution section performs:
identifying the order of processing of the component diagrams from connection relations between the component diagrams in the prepared model diagram and selecting, one by one, the lower-level component diagrams in the prepared model diagram in the order of processing;
when the selected lower-level component diagram is the input/output data memory management component diagram, allocating and deallocating memory for a data structure to be input to or output from a library function in the programming language library;
when the selected lower-level component diagram is the input data value setup component diagram, setting a value of a data structure to be input to or output from the library function with respect to the allocated memory;
when the selected lower-level component diagram is the library execution component diagram, referencing the value of a data structure to be input to or output from the library function and calling the programming language library; and
when the selected lower-level component diagram is the output data value acquisition component diagram, reading the result of execution from a data structure storing the result of execution that is obtained when the programming language library is called.

16. The image processing software development device according to claim 14, wherein the control device for the image processing software development device further configures a code generation section, and wherein the code generation section performs:
identifying the order of processing of the component diagrams from connection relations between the component diagrams in the prepared model diagram and selecting, one by one, the lower-level component diagrams in the prepared model diagram in the order of processing;
when the selected lower-level component diagram is the input/output data memory management component diagram, outputting the programming language source code for allocating and deallocating memory for a data structure to be input to or output from a library function in the programming language library from memory in the image processing device;
when the selected lower-level component diagram is the input data value setup component diagram, outputting the programming language source code for setting a value of a data structure to be input to or output from the library function with respect to the memory allocated in the image processing device;
when the selected lower-level component diagram is the library execution component diagram, referencing the value of a data structure to be input to or output from the library function and outputting the programming language source code for calling the programming language library in the image processing device; and
when the selected lower-level component diagram is the output data value acquisition component diagram, outputting the programming language source code for reading the result of execution from a data structure storing the result of execution that is obtained when the programming language library is called in the image processing device.

17. An image processing software development program for causing the image processing software development device, which is a computer, to execute the image processing software development method according to claim 1.

* * * * *